Patented May 22, 1923.

1,456,303

UNITED STATES PATENT OFFICE.

PER GÖSTA EKSTRÖM, OF STOCKHOLM, SWEDEN, ASSIGNOR TO AKTIEBOLAGET SYREFAST MURNING, OF STOCKHOLM, SWEDEN, A CORPORATION OF SWEDEN.

ACIDPROOF MORTAR.

No Drawing.   Application filed December 16, 1920.   Serial No. 431,301.

*To all whom it may concern:*

Be it known that I, PER GÖSTA EKSTRÖM, a subject of the King of Sweden, residing at 23 Flemminggatan, Stockholm, in the Kingdom of Sweden, have invented certain new and useful Improvements in Acidproof Mortars, of which the following is a specification.

My present invention has for its object an acid-proof binding agent which is adapted to be used as a mortar in lining cellulose boilers or other vessels in which acids or other corrosive agents are used at high temperatures with acid-proof bricks. The said binding agent or mortar is chiefly characterized by the fact that the same consists of a finely divided mixture of silica or silicates, for instance blast furnace slag (iron slag), which materials are hereinafter included in the expression "hard siliceous material," together with one or several oxids of lead, suitably litharge, and finally soap-stone, asbestos or similar materials containing magnesium silicates. My present mortar may, besides the above mentioned constituents, also contain one or several inert filling materials.

The above constituents are finely pulverized separately for example in a tube mill, and are then intimately mixed together. When the mortar is to be used, the said pulverous mass is stirred up with water glass so as to form a paste.

When the acid or acid constituent contained in the boiler acts on the mortar at high temperatures (or at ordinary temperature during a longer time) the mortar will become very hard and solid and does not break on being cooled or exposed to the action of cold water. In this respect the present mortar differs from previously known acidproof mortars which after having cooled down or having been exposed to the action of water, easily break and must often be repaired.

The proportions of the constituents can be varied within wide limits. The following example gives the proportions which have been found to be most suitable for several practical purposes, such as the lining of pulp digestors:

|  | Parts by weight. |
|---|---|
| Blast furnace slag | 55–78 |
| Litharge | 12–30 |
| Soapstone | 10–15 |

The proportions are generally dependent on the speed with which the mass is intended to harden, the desired degree of hardness etc. The litharge or other lead oxide, such as mud from accumulators can be used instead of pure litharge, this material being included in the expression "a lead oxid" as hereinafter used. The soapstone which can be replaced by asbestos, magnesia or other "fat" magnesium minerals (materials which have a "fat" or greasy feel) has for its object to make the mass fat and ductile. By suitably proportioning the constituents the mass can obtain the same coefficient of expansion by heat as iron, which is of the greatest importance for its durability. Due to the above mentioned manner in which the silicates are formed and precipitated the mass will have a high degree of elasticity so that it can be alternately heated and cooled without breaking.

I claim:

1. Acidproof binding agent, containing a mixture of finely divided hard siliceous material, a lead oxid, and a magnesium silicate material, together with water glass.

2. Acidproof mortar as set forth in claim 1, characterized by the fact that the same, besides the constituents set forth in said claim, contains an inert filling material.

3. Acidproof mortar containing 55–78 parts of weight of siliceous blast furnace slag, 12–30 parts of litharge and 10–15 parts of soap-stone; and a sufficient quantity of water glass to afford a plastic mass.

In testimony whereof I have affixed my signature in presence of two witnesses.

PER GÖSTA EKSTRÖM.

Witnesses:
AXEL EHRUER,
WILLIAM L. PEEK.